July 10, 1962 L. G. HARRIS 3,044,058
THREE DIMENSIONAL ISOMETRIC DISPLAY SYSTEM
Filed Oct. 13, 1953 3 Sheets-Sheet 1

INVENTOR.
LUTHER G. HARRIS
BY George Sipkin
George E. Pearson
ATTORNEYS

July 10, 1962   L. G. HARRIS   3,044,058
THREE DIMENSIONAL ISOMETRIC DISPLAY SYSTEM
Filed Oct. 13, 1953   3 Sheets-Sheet 3

INVENTOR.
LUTHER G. HARRIS
BY George Sipkin
George E. Pearson
ATTORNEYS

United States Patent Office 3,044,058
Patented July 10, 1962

3,044,058
THREE DIMENSIONAL ISOMETRIC
DISPLAY SYSTEM
Luther G. Harris, San Diego, Calif., assignor to the United States of America as represented by the Secretary of the Navy
Filed Oct. 13, 1953, Ser. No. 385,900
5 Claims. (Cl. 343—7.9)
(Granted under Title 35, U.S. Code (1952), sec. 266)

The invention described herein may be manufactured and used by or for the Government of the United States of America for governmental purposes without the payment of any royalties thereon or therefor.

This invention relates to a three dimensional isometric display system and more particularly to a radar system for displaying three coordinate target information in a three dimensional isometric type of projection on cathode ray tubes.

Many attempts have been made to portray information obtained by radar scanning in three dimensions. Most of these systems portray two dimensions in a conventional manner in a plan position indicator, usually the two dimensions in a horizontal plane which may be read out and displayed as range and bearing or as X and Y rectangular coordinates. The third dimension is usually portrayed by a form of coding which may be size, color, the length of a radial line extending toward the target, or a vertical strobe through the target. Read out of the third dimensional information is usually approximate, or at best very inaccurate, and oftentimes confuses or completely obliterates the information which would normally be obtained from a plan position indicator. Another system utilizes the plan position indicator showing bearing and range on an inner circle and the height shown on an outer annulus, where the radial distance from the outer edge of the inner circle indicates the height of the target. The two displays are correlated by means of target bearing and where two targets lie on the same bearing, it is impossible to determine the height of each individual target. Sometimes another tube is used in conjunction with the plan position indicator tube and displays range plotted against height. None of these systems portray the three dimensional information in a form which presents a clear visual concept of the spatial arrangement of the object, such as land, air, or sea targets with respect to own ship or adjacent land masses and configurations. Various forms of synthesized stereoscopic pictures have also been utilized for displaying three dimensional information utilizing polarized light or two color pictures with two images suitably offset and diminished to get a pictorial effect of three dimensions in space. This type of display, however, does not provide accurate information for read out or even estimation of range, bearing and height.

Many of the difficulties experienced with the previous systems have been overcome by the use of a three cordinate orthographic display system utilizing two separate tubes or two separate views on a single tube displaying an elevation view representing the targets accurately in the X and Z coordinates and a plan view representing the targets accurately in the X and Y coordinates as disclosed in the co-pending application of Coburn and Donahue, Ser. No. 383,414, filed September 30, 1953, which has matured into Patent No. 3,005,195, issued October 17, 1961. The orthographic or XY—XZ type of display, while it has many advantages, has certain limitations, particularly for certain uses. The display is not self-explanatory in a visual sense, since the operator usually must be trained to relate the XZ display to the XY display through the common coordinates and both tubes or views must be used together to determine the range, height and bearing of a target. Furthermore, the entire display is traced on the cathode ray tube twice during each revolution of the antenna and the integration of noise due to this retrace clutters the screen and hampers the locating of targets, unless the views are limited to 180 degrees sector or less.

One preferred embodiment of the present invention as disclosed herein consists of a circuit for resolving raw radar data and applying it to the deflection coils and grids of a cathode way tube to produce an isometric type of display which represents the targets in a realistic three dimensional type of picture covering the entire volume of space scanned by the height antenna radiation field. As disclosed herein the isometric view may be combined, if desired, with a conventional plan position indicator type of display to facilitate more accurate read out of the X and Y coordinates, or range and bearing, as may be desired. However, range, bearing and height may be estimated or read out from the XYZ view alone with sufficient accuracy for many applications.

One object of the present invention is to provide a system and display for presenting three coordinate target information in a single isometric view wherein the position information is presented as a realistic three dimensional type of picture of the volume of space scanned by the height antenna radiation field to provide a clear concept of the three dimensional structural configuration to the operator.

Another object of the present invention is to provide an improved method and apparatus for presenting a three coordinate display on a single cathode ray tube wherein all three coordinates may be read out or estimated with adequate accuracy.

A further object of the present invention is to provide an improved display for three cordinate target information which facilitates interpretation and the perception of spatial configuration by a single pictorial view which is analogous to dimensionality and visual impressions experienced in everyday life and therefore requires a minimum of training for proficiency in operation.

A still further object of the present invention is to provide a system for three coordinate display of spatial target information which will accept all three of the commonly utilized three coordinate input system, that is, spherical, cylindrical, and rectangular, and which may be utilized in conjunction with radar, sonar, and other analogous scanning systems for detecting and locating objects in space and with various types of simulators and radar and sonar trainers.

Still another object of the present invention is to provide a three dimensional display which minimizes overlapping, clutter and confusion, and wherein ambiguities may be readily resolved without affecting the qualitative interpretation of the display.

Another object of the present invention is to provide a method and apparatus for resolving and applying information obtained in three coordinates by a radiant energy scanning system which may be readily modified and provided with suitable switches and controls for accepting numerous types of input, and displaying the spatial target information in various different manners utilizing the same basic system and circuitry.

Other objects and many of the attendant advantages of this invention will be readily appreciated as the same becomes better understood by reference to the following detailed description when considered in connection with the accompanying drawings wherein.

Figure 1:
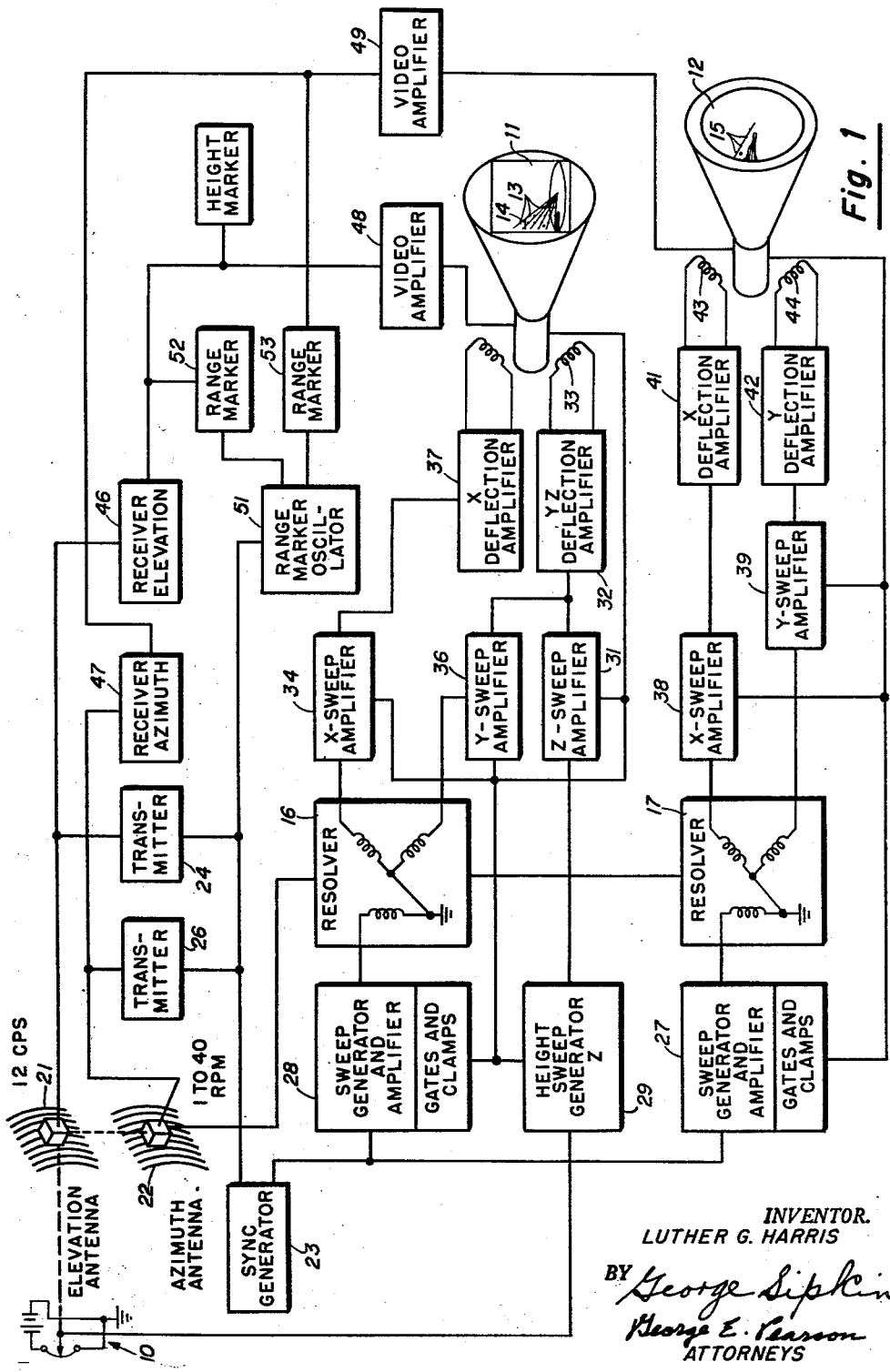
FIG. 1 is a block diagram illustrating one preferred form of the present invention applied to a radar system utilizing separate elevation and azimuth antennas, and shows the relationship of the trace deflection in accordance with various azimuth and vertical positions of the antenna.

Referring now to the drawing in detail and particularly to FIG. 1, one preferred and simplified embodiment of the present invention is shown in block diagram form in conjunction with a radar system utilizing two antennas, an elevation antenna 21 and an azimuth antenna 22.

Both antennas are rotated about a vertical axis at a relatively slow speed, usually about 1 to 40 revolutions per minute. The elevation antenna 21 or the energy beam therefrom is also oscillated about a horizontal axis at a more rapid rate which may be, for instance, approximately 12 cycles per second or any other desired speed which will produce a picture of adequate resolution.

The system disclosed illustrates a height and search, or elevation and azimuth antennas synchronized with the height and search system simultaneously triggered. However, it will be apparent that the present invention requires only the elevation antenna to provide the isometric view or XYZ display shown in the upper tube 11 and the height and search systems could be entirely separate and distinct with separate antennas and separate triggers.

The system illustrated has been disclosed as a preferred embodiment, because it may be readily changed over from the XYZ display in the upper tube 11 to an XZ display or a plot of range versus height without any substantial modification, as will be apparent from a careful consideration of the following description.

The sync generator 23 or timer transmits a synchronizing signal to each of the transmitters 24 and 26 connected to the azimuth and elevation antennas 21 and 22, respectively, and to the sweep generators 27 and 28 for the upper and lower cathode ray tubes 11 and 12.

A pair of resolvers 16 and 17 are suitably connected mechanically or electrically to the antenna for synchronous revolution therewith at the same speed as the rotation of the antenna about the vertical axis. Each of the resolvers is connected respectively to its associated sweep generator and amplifier, and produces an X and Y component or signal corresponding to the relative bearing or polar angular aspect of the antenna.

A height sweep generator 29 is connected to a tilt potentiometer 10 mounted on the elevation antenna and which, in FIG. 1, is located within the box which depicts the elevation antenna mounting assembly. The potentiometer develops a voltage corresponding to the angle of elevation of the narrow beam of the elevation antenna and which is fed to the height sweep generator. The height sweep generator 29 develops a sawtooth voltage which is applied through the Z sweep amplifier 31 and the YZ deflection amplifier 32 to the vertical deflection coil 33 of cathode ray tube 11.

The X and Y components or signal voltages developed by the resolver 16 are amplified in the X sweep amplifier 34 and the Y sweep amplifier 36 respectively associated therewith. The output of the X sweep amplifier 34 is connected to the X deflection amplifier 37 to provide the current necessary for horizontal deflection of the electron beam in cathode ray tube 11. The output of the Y sweep amplifier 36 is attenuated relative to the X sweep and Z sweep by reducing the gain on the Y sweep amplifier 36 to provide a sawtooth sweep voltage of reduced amplitude which is added to the output of the Z sweep amplifier 31 and applied to the YZ deflection amplifier 32 so that the outer edge of the trace describes an ellipse whose vertical axis is proportional to the amplitude of the Y sweep and can be adjusted by varying the relative amplitude of the Y voltage that is fed into the YZ deflection amplifier 32. It will be apparent that the resulting picture is analogous to an isometric view in drafting technique and is a close approximation of the view which would actually be seen by an observer at a point distant from the scanned volume of space and at any desired height above the space scanned.

As illustrated in FIG. 1 another resolver 17 provides X and Y components or signal voltages which are applied through the respective X sweep and Y sweep amplifiers 38 and 39, respectively, and thence through the respective X deflection and Y deflection amplifiers 41 and 42, respectively, to the deflection coils 43 and 44, respectively, of the cathode ray tube 12 to provide a conventional plan position indicator type of display which is directly correlated with the XYZ or isometric display in tube 11.

The video signals received by the antenna are transmitted to an elevation receiver 46 and an azimuth receiver 47 and thence through video amplifiers 48 and 49 to the cathode ray tubes 11 and 12 respectively.

A range marker oscillator 51 which is triggered by a signal from the sync generator 23 activates a pair of range markers 52 and 53 which supply a series of intensifying range marker signals to each of the cathode ray tubes 11 and 12 through their respective video amplifiers 48 and 49, respectively.

The pictures displayed by the upper and lower cathode ray tubes 11 and 12 are clearly illustrated in the series of FIGS. 2 through 6 which show the development of a plurality of air and sea targets and land masses over a 180 degree sector taken at 45 degree intervals.

The actual pictures displayed on the tubes 11 and 12 will appear as light lines and areas formed by activation of the phosphorescent coating by the electron beam on the dark face of the tube, but is shown as dark lines and shaded areas on a white background for clarity in the drawing.

Figure 1A:
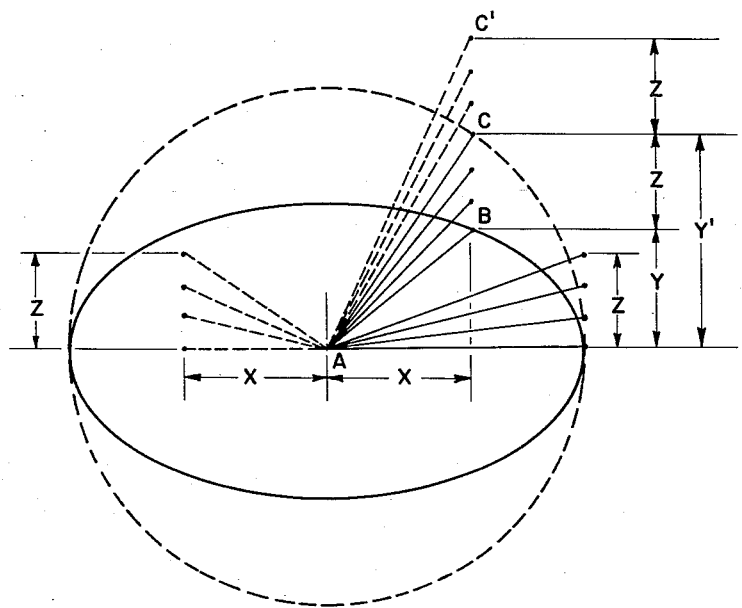

As previously stated, FIGURE 1a shows the relationship of the trace deflection in accordance with various azimuth and vertical positions of the antenna. This is accomplished by employing a cathode ray tube in which means are provided for moving the beam of the tube in a succession of radial traces repeated at the radar pulse repetition rate. Such a trace, for example, is designated AC in FIGURE 1a and is produced by X and Y' deflection voltages which are cosine and sine components of the sweep generator voltage. The resolver 16 (see FIG. 1) converts the radial scan or sweep voltage to the sine and cosine components. The cosine component, after suitable amplification, is applied directly to the horizontal deflection coil of tube 11 and the beam, accordingly, is moved in the X dimension from A to maximum sinusoidally in both directions at the antenna azimuth scan rate. Likewise the sine component, after suitable amplification is directly applied to the vertical deflection coil of tube 11 and the beam, accordingly, is moved in the Y' direction from A to maximum sinusoidally in both directions at the antenna azimuth scan rate but 90° out of phase with the beam movement in the X dimension. As a result of these component movements, a succession of radial traces such as AC are produced and the trace AC, in effect, is rotated about the point A in step with rotation of the antenna in azimuth about its vertical axis, the point C thus describing the circle shown in FIGURE 1a.

The antenna movement in elevation, which is relatively greater than the azimuth scan rate, drives the potentiometer 10 to produce a voltage which varies in amplitude at the antenna oscillation rate about its horizontal axis. The height sweep generator modulates this voltage at the pulse repetition rate and this voltage, after suitable amplification, is applied directly to the vertical deflection coil of tube 11 for moving the beam in the Z dimension. As a result of this additional voltage, a voltage directly proportional to the sum of the Y and Z voltages is applied to the vertical deflection coil, and an additional succession of traces is produced while trace AC is in the instantaneous position shown. These traces become progressively longer, as the tilt potentiometer voltage increases, and reach a maximum at C'. The distance CC' is along the Z dimension which thus indicates height in the XZ plane which is best illustrated by the lighter weight full line traces disclosed in the right hand portion of the sketch and corresponding to the condition Y=0 and X is maximum. The XZ plane is further illustrated by the dashed line traces shown in the left hand portion of FIGURE 1a which are produced when the Y sweep amplifier is adjusted to attenuate the Y component voltage to zero, thus producing only an XZ display. On the other hand, when the Z sweep amplifier is adjusted to zero there is produced only an XY or P.P.I. type display.

When the Y sweep amplifier is adjusted to an intermediate value such, for example, as by reducing the instantaneous value Y' to Y, the trace AC now becomes trace AB and trace AC conveniently is used to illustrate the maximum height sweep trace corresponding to trace AC'. As before, the successive height sweep traces from AB to AC are laid down while trace AB momentarily is in the position illustrated. As a result of the attenuation of the Y sweep amplifier, point B now describes an elipse as the trace AB rotates about A, and a succession of vertical isometric planes will be developed, each including the triangular area ABC. Likewise without attenuation of the Y amplifier, each such plane will include the triangular area ACC'. These vertical planes which include the two XZ planes aforementioned all intersect in a common line, namely the central axis of the elipse which passes through the point A as indicated.

Figure 2:
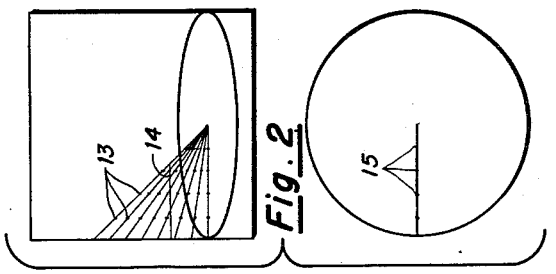

It will be apparent that, during a single complete elevation cycle, a complete triangular area will be scanned by a plurality of radial lines on the tube 11 while a single line is being scanned repeatedly on the tube 12, as illustrated in FIG. 2. While only 8 lines have been shown covering the triangular area on tube 11 for the sake of clarity, it will be understood that this area will be covered in actual use by a large number of lines corresponding to the number of discrete signals transmitted during each period of oscillation of the elevation antenna, and each line will have a plurality of intensified spots such as those indicated at 13 at equal intervals produced by the range marker 53 which corresponds to the range marking spots 15 on the lines on tube 12. Actually the plurality of spots at each interval of horizontal range will merge into a number of vertical lines on the upper tube 11 and a number of concentric circles on the lower tube 12.

Figure 3:
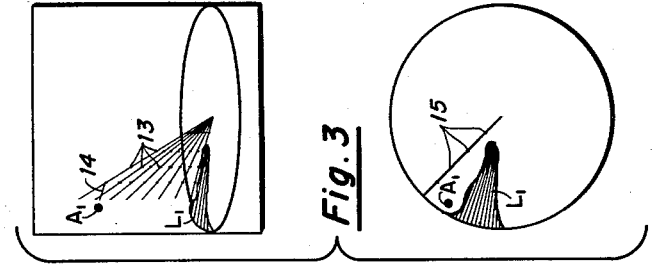

FIG. 3 illustrates the development of an air target A1 and a land mass, L1, after 45 degrees rotation of the sweep, the sweep being shown during one cycle of the elevation antenna and the target remaining on the screen due to persistence of the intensified spots and areas caused by the video signal.

Figure 4:
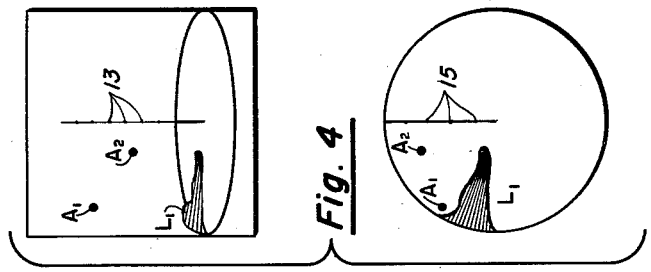

The picture is shown in FIG. 4 with the sweep at 90 degrees from that shown in FIG. 2, and in this position it is possible to have some ambiguity with two targets on the same bearing or directly in line with the same X coordinate and at different ranges and elevations. However, this ambiguity may be resolved readily by rotation of the target field as described in the co-pending application of Coburn and Donahue, noted supra.

Figure 6:
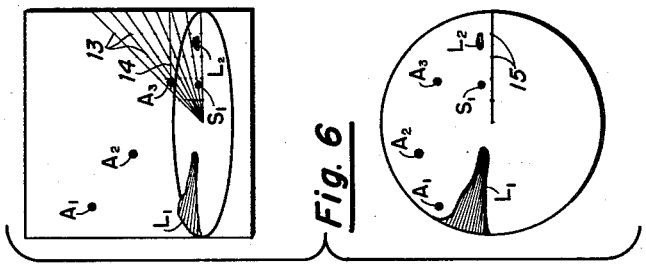
FIGS. 2 through 6 are a series of correlated views of the images presented on the upper and lower tubes to show the development of a plurality of targets and land masses during 180 degrees of the sweep.
Figure 5:
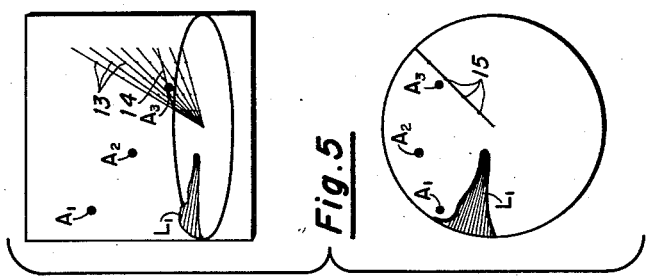

Additional air targets A2 and A3 are shown developed in FIGS. 4 and 5, where the sweep has progressed through an additional 45 degree angle in each view. In FIG. 6, the sweep of the 180 degree sector has been completed with the additional development of a sea target, such as a ship, S1, and an additional land target or island, L2.

While some ambiguity exists with respect to targets such as A3 and S1 which have the same coordinate on an XY—XZ type of orthographic display, the ambiguity is resolved by means of the present invention due to the realistic perspective obtained in the XYZ type of isometric display which clearly indicates the spatial relationship of the targets.

Any ambiguities which may exist can be readily resolved by gradual rotation of the field or by rotation of the field through a 90 degree angle in either direction. It is occasionally advisable to rotate the target field to bring the targets of particular interest into a sector where there is less interference from other targets and less retrace of the sweep to assist in interpretation and identification of the target of particular interest.

While the visual effect is difficult to portray in a series of drawings, the correlation and spatial configuration of the targets is materially assisted by watching the sweep at it progresses throughout the scanned volume of space and the actual effect is very similar to that of a true three dimensional picture.

The sweep on the screen of the cathode ray tube 11 may be clearly shown by adjusting the intensity control so that a visible trace is displayed at all times with the echo signal from any object in the space scanned increasing the intensity to show a bright spot or area. This mode of operation improves the three dimensional visual effect.

The visible trace can also be utilized in a radar trainer to facilitate the explanation of radar and sonar systems, since the sweep trace displayed in a three dimension isometric view conveys a clear picture of the actual energy transmission in space by the radar antenna system and the sonar transducer system.

The height line 14 has been indicated in FIGS. 2 through 6 as an adjustable straight line parallel to the base of the triangle which corresponds to one complete sweep cycle of the elevation antenna 21 in a vertical plane, and its movement may be correlated with a suitable read out system for indicating height. The height line 14 may be adjusted on the face of the tube to intersect any desired target as shown.

Earth curvature corrections may be readily introduced by utilizing a properly curved height line or by curving the sweep trace itself as disclosed in the co-pending application of Coburn and Donahue, noted supra. However, in most cases it is not necessary to utilize any correction of the height read out for earth curvature correction, since the range is not usually sufficient to introduce any substanaial error due to earth curvature and over longer ranges the radio frequency energy beam tends to follow the curvature of the earth to some extent.

Range can usually be estimated with sufficient accuracy from the range markers 13 on the tube 11, where it may be desired to utilize the upper tube 11 alone without the conventional plan position indicator tube 12 and its associated circuitry. The bearing can also be estimated with sufficient accuracy and read out of bearing from the isometric or XYZ view alone may be facilitated by a suitable electronic bearing cursor or by an elliptical overlay with the intervals of bearing marked thereon. If desired, an electronic cursor with a "bug" or spot movable along the cursor line may be utilized for reading out range, bearing and height information. In many cases, however, it is desirable to have the XY display on the tube 12 which will facilitate more accurate read out of range and bearing by joystick, range and bearing cursor or by a conductive glass overlay on the lower tube 12.

It will be apparent that by reducing or attenuating the output of the Y sweep amplifier to zero that the ellipse shown on FIGS. 2 through 6 will be reduced to a straight line and the resulting display will show only the X and Z coordinates, as in the application of Coburn and Donahue, noted supra. The same result, of course, could be accomplished by a simple switching arrangement which would disconnect the Y sweep amplifier from the YZ deflection amplifier.

The circuit illustrated in FIG. 1 may also be readily modified by connecting the X sweep amplifier 34 directly to the sweep generator amplifier 28 rather than through the resolver 16 to display a plot of range versus height in a conventional manner.

By simultaneously attenuating the gain on the Z sweep amplifier while increasing the gain on the Y sweep amplifier and vice-versa, a pictorial effect could be obtained in the upper tube 11 which would closely approximate a true perspective of the volume being scanned by the radar system as seen at various vantage points from a point at a distance on the horizon to a point directly overhead which would correspond to the view shown on tube 12. This would have the effect of foreshortening the height of the sweep triangle as the vertical axis of the ellipse is increased.

It will be apparent that the present circuit will be adaptable to many of the modifications and refinements mentioned with respect to the system and apparatus disclosed in the co-pending application of Coburn and Donahue, noted supra. Such modifications and refinements might include such features as joystick read out, acceptance of spherical, cylindrical or rectangular coordinates from search systems or simulators, polar off-centering, gating in bearing and bearing sector, gating in range and range sector, use of an area coverage indicator, conductive glass overlay type of read out, automatic tracking and plotting, the use of rectangular or dual gun tubes, and other conventional techniques.

The display of the present invention is particularly well adapted for use with photographic techniques, since a series of pictures of the upper tube presents a clear pictorial view which may be readily interpreted to follow the progress of any action or activity in a particular area at a later time, and when taken simultaneously with a view of the lower tube 12, presents a complete and comprehensive series of pictures which may be accurately interpreted.

While a display consisting of an isometric type of view has been indicated as a preferred form of the present invention, it will be apparent that the XYZ display may not be an exact isometric view and other forms of pictorial representation by projection of rectangular or polar coordinates on a single plane could also be displayed utilizing the basic concepts of the present invention. The pictorial views possible with range and sector gating might approximate various forms of axonometric or oblique perspective, while simultaneous control of the gain on the Z and Y sweep amplifiers as indicated supra would provide a series of different views of the dimetric type. Other types of perspective, such as conic projection, could also be approximated by suitable variations and controls.

Obviously many modifications and variations of the present invention are possible in the light of the above teachings. It is therefore to be understood that within the scope of the appended claims the invention may be practiced otherwise than as specifically described.

What is claimed is:

1. A three coordinate display system comprising a cathode ray tube having an indicating electron beam with deflecting and intensity control elements operative to control said indicating beam, a scanning system adapted to scan a volume of space with a narrow directional beam of energy, said beam being rotatable about a substantially vertical axis at a relatively low angular velocity and oscillatable about a substantially horizontal axis at a relatively high angular velocity, a sweep generator adapted to generate a sweep voltage, resolving means connected to said sweep generator and operatively associated with said scanning system for developing X and Y sweep voltages proportional to the rectangular coordinates corresponding to the angular position of said beam about said vertical axis, a height sweep generator, resolving means connected to said height sweep generator and operatively associated with said antenna system for developing a Z sweep voltage proportional to another rectangular coordinate corresponding to the angular position of said beam about said horizontal axis, means for applying the X sweep voltage to the horizontal deflecting elements of the cathode ray tube, means for respectively applying both the Y and Z sweep voltages to the vertical deflection coils of the cathode ray tube, and means coordinated with said generators for transmitting and receiving a series of energy pulses through said scanning system and applying the echo pulse signal from any object in said volume of space to the intensity controls of said cathode ray tube to produce a visible pictorial display on said tube representing the objects in said volume by spatial rectangular coordinate in three dimensions.

2. A three coordinate radar display system comprising a cathode ray tube having an indicating electron beam with deflecting coils and an intensity control grid operative to control said indicating beam, an antenna system adapted to scan a volume of space with a narrow directional beam of radio frequency energy, said beam being rotatable about a substantially vertical axis at a relatively low angular velocity and oscillatable about a substantially horizontal axis at a relatively high angular velocity, a sweep generator adapted to generate a sweep voltage, a resolver connected to the sweep generator and operatively associated with said antenna system for developing X and Y sweep voltages proportional to the rectangular coordinates corresponding to the angular position of said beam about said vertical axis, a height sweep generator, a potentiometer connected to said height sweep generator and operatively associated with said antenna system for developing a Z sweep voltage proportional to another rectangular coordinate corresponding to the angular position of said beam about said horizontal axis, means for applying the X sweep voltage to the horizontal deflecting coils of the cathode ray tube, means for respectively applying both the Y and Z sweep voltages to the vertical deflection coil of the cathode ray tube, and means synchronized with said generators for transmitting and receiving a series of radio frequency pulses through said antenna system and applying the echo pulse signal from any object in said volume of space to the intensity controls of said cathode ray tube to produce a visible pictorial display on said tube representing the objects in said volume by spatial rectangular coordinate in three dimensions.

3. A three coordinate radar display system comprising a cathode ray tube having an indicating electron beam with deflecting coils and an intensity control grid operative to control said indicating beam, an antenna system adapted to scan a volume of space with a narrow directional beam of radio frequency energy, said beam being rotatable about a substantially vertical axis at a relatively low angular velocity and oscillatable about a substantially horizontal axis at a relatively high angular velocity, a sweep generator adapted to generate a sweep voltage, a resolver connected to the sweep generator and operatively associated with said antenna system for developing X and Y sweep voltages proportional to the rectangular coordinates corresponding to the angular position of said beam about said vertical axis, a height sweep generator, a potentiometer connected to said height sweep generator and operatively associated with said antenna system for developing a Z sweep voltage proportional to another rectangular coordinate corresponding to the angular position of said beam about said horizontal axis, means for applying the X sweep voltage to the horizontal deflecting coils of the cathode ray tube, means for attenuating the Y sweep voltage relative to the X and Z sweep voltages, means respectively for applying both the Y and Z sweep voltages to the vertical deflection coil of the cathode ray tube, and means synchronized with said generated sweep voltages for transmitting and receiving a series of radio frequency pulses through said antenna system and applying the echo pulse signal from any object in said volume of space to the intensity controls of said cathode ray tube to produce a visible pictorial display on said tube representing the objects in said volume by spatial rectangular coordinate in three dimensions.

4. In a direction and ranging system having an antenna rotatable in azimuth and oscillatable in elevation and having a transmitter and a receiver, said transmitter being adapted to pulse the antenna periodically and said receiver being adapted to receive target echoes, a cathode ray tube having a fluorescent screen, means for producing on said screen radial traces repetitively at the pulse repetition rate, means for rotating said radial traces in synchronism with the antenna azimuth rotation, means for simultaneously rotating said radial traces through an angle corresponding to the elevation angle of the antenna and successively elongating consecutive traces in an amount corresponding to the change in said elevation angle, said last mentioned rotation of the traces occurring at a greater rate than said azimuth synchronized rotation of the traces.

5. The system of claim 4 wherein said means for rotating the radial traces includes means for causing corresponding points on corresponding traces to elliptically sweep said screen during antenna azimuth rotation.

References Cited in the file of this patent

UNITED STATES PATENTS

| | | |
|---|---|---|
| 2,449,542 | Ayres et al. | Sept. 21, 1948 |
| 2,514,828 | Ayres | July 11, 1950 |
| 2,578,970 | Gannaway | Dec. 18, 1951 |
| 2,630,563 | Haworth | Mar. 3, 1953 |
| 2,637,025 | Cutter | Apr. 28, 1953 |
| 2,648,061 | Parker et al. | Aug. 4, 1953 |
| 2,718,000 | Sunstein | Sept. 13, 1955 |
| 2,811,789 | Paine | Nov. 5, 1957 |

OTHER REFERENCES

"Three-Dimensional CR Tube Displays" by Parker. Journal Institute of Radio Engineers (Great Britain), September 1948, pp. 371 to 390 (pp. 378 and 379 relied on).